United States Patent
Damera-Venkata et al.

(10) Patent No.: US 8,543,455 B2
(45) Date of Patent: Sep. 24, 2013

(54) SYSTEM AND METHOD OF PROVIDING CONTENT TO USERS

(75) Inventors: Niranjan Damera-Venkata, Palo Alto, CA (US); David Joel Wu, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1626 days.

(21) Appl. No.: 11/788,100

(22) Filed: Apr. 18, 2007

(65) Prior Publication Data

US 2008/0262916 A1  Oct. 23, 2008

(51) Int. Cl.
*G06Q 30/00* (2012.01)

(52) U.S. Cl.
USPC .......................................... 705/14.45; 725/35

(58) Field of Classification Search
USPC .......................................... 705/14.45; 725/35
See application file for complete search history.

(56) References Cited

U.S. PATENT DOCUMENTS

| | | | |
|---|---|---|---|
| 6,408,278 B1 * | 6/2002 | Carney et al. | 705/14.73 |
| 6,611,810 B1 | 8/2003 | Kolls | |
| 6,760,047 B2 * | 7/2004 | Hough et al. | 715/753 |
| 2003/0119447 A1 | 6/2003 | Fisher et al. | |
| 2004/0165006 A1 * | 8/2004 | Kirby et al. | 345/740 |
| 2005/0154644 A1 * | 7/2005 | Deakin et al. | 705/26 |
| 2006/0100930 A1 | 5/2006 | Novak-Torre | |
| 2006/0287913 A1 | 12/2006 | Baluja | |
| 2007/0033102 A1 | 2/2007 | Frank et al. | |

FOREIGN PATENT DOCUMENTS

WO   WO 2006/052837 A2   5/2006

* cited by examiner

*Primary Examiner* — John Van Bramer
*Assistant Examiner* — Stacie Gatling (57) ABSTRACT

A system for providing content to consumers includes a public display; a database configured to store the content; and a central processing element configured to concurrently receive parallel user input from a plurality of users and present content from the database on the public display relevant to each user's input.

19 Claims, 7 Drawing Sheets

SYSTEM AND METHOD OF PROVIDING CONTENT TO USERS

BACKGROUND

It is common for providers of goods and services to inform potential customers of the existence and selling points of their products through advertising. However, all advertising is not equally effective. Experience has shown that advertising aimed at a specific target group which is likely to have a need for, or interest in, a particular product is in general much more effective than advertising intended for the public as a whole. Consequently, advertisers are often faced with the formidable task of creating strategies to effectively reach a specific demographic group with targeted marketing.

Providers of goods and services, acting as advertisers, typically pay for the use of media such as billboards, signage, television and radio broadcasts, internet media, and printed publications such as newspapers and magazines to make their advertisements available to the public. These media are viewed by many people, some targeted at specific groups of people with varying degrees of effectiveness. Consequently, wise use of such advertising media increases the likelihood that sales of the advertised product or service will produce desired revenue levels to a business.

Typically, a direct relationship exists between the rates charged by owners or purveyors of media available to the public and the estimated size or composition of the audience that media has been shown to command.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In some cases, it may be desirable to advertise products or services in a public location having a high amount of foot traffic, such as a shopping center or city plaza. However, due to the diversity of people that often pass through these locations, it is difficult to provide advertisements in such an environment that efficiently reach a desired group of potential customers or that capture the interest of the people passing through the area. Advertisers who are paying for advertising services in such environments would consider an ideal advertising opportunity to be one that only displays advertisements targeted to the demographics of the people viewing the advertisement space in real time. However, there has previously been no such viable advertising solution that does so in a high traffic, public environment.

In many public areas, people are constantly seeking consumer information regarding the goods and services available at that location. This consumer information desired may be as diverse as the people themselves, including such information as sales notifications, product comparisons, merchandise stock information, directions, coupon codes, and the like. For example, in a mall or shopping center, it is common for potential consumers to wonder which stores in the mall offer a particular product for sale and what differences may exist between comparable products offered at different stores. Other people in the mall may desire public service announcements or directions to a favorite restaurant.

To address the issues of providing targeted advertising and consumer information to people in a public location, the present specification describes systems and methods of providing such content to consumers. The principles of the present specification enable the interactive delivery of relevant advertising content to a public display, and allow multiple asynchronous parallel consumers to interact with and receive content from the public display concurrently. Through analysis of consumer interaction, advertising determined to be most relevant to the consumers may be provided to them via the public display. Furthermore, the systems of the present specification allow for convenient consumer interaction via the public display or personal electronic devices such as personal digital assistance (PDAs) and mobile phones.

As used in the present specification and in the appended claims, the term "personal electronic device" refers to an electronic apparatus configured to interact with a central processing element such as a server or a supporting wireless network. Personal electronic devices thus defined may be handheld, battery-powered and may communicate wirelessly with the central processing element or wireless network. Other personal electronic devices thus defined may receive power and/or communicate with the central processing element through a wired connection. Examples of personal electronic devices include, but are not limited to, personal digital assistants (PDAs), portable computers, mobile and cellular phones, wired devices provided in conjunction with a public display, and custom devices.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary systems and methods of providing content to consumers.

Exemplary Systems

Figure 1:
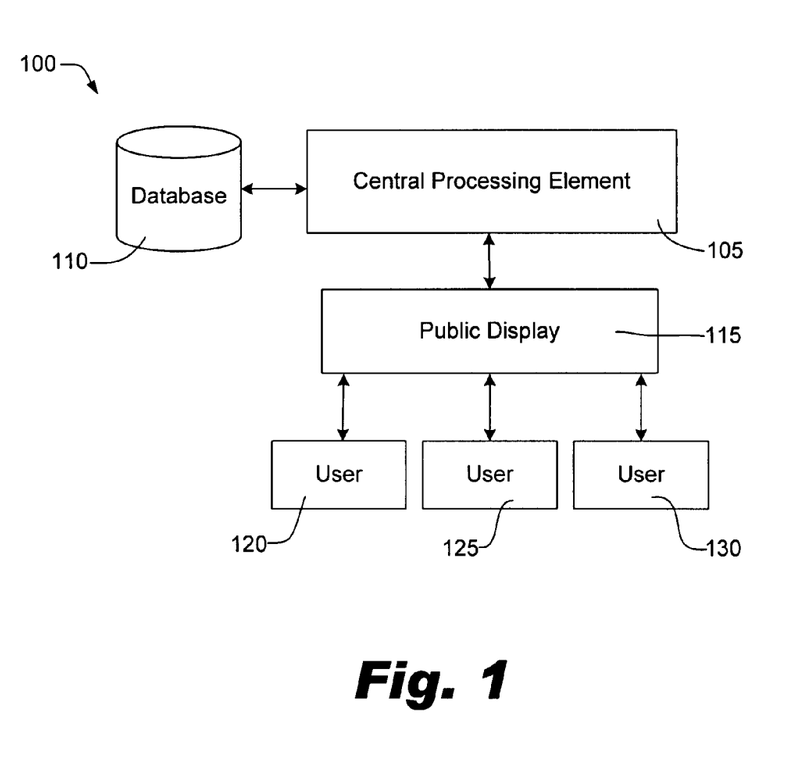
FIG. 1 is a block diagram of an exemplary system of providing content to consumers.

Referring now to FIG. 1, a block diagram of an exemplary system (100) for providing content to consumers and potential customers is shown. The exemplary system (100) may be placed in a public area such as a mall, shopping center, city plaza, museum, or other public area having a significant amount of pedestrian traffic. The exemplary system (100) includes a central processing element (105) with access to a database (110). The central processing element (105) is in communication with and controls a public display (115).

The public display (115) is an electronic display device that may display images under the control of the central processing element (105). The display (115) may display a still image, a series of still images or motion picture video to convey the desired advertising information or impression. The public display (115) may include one or more of video screens, projected images, plasma displays, liquid crystal displays, light emitting diode displays, speakers, and the like.

The public display (115) may be placed in a prominent location of the public area such that it may be readily seen by many people passing through the area. For example, a public display (115) consistent with the exemplary system (100) shown may be a large video screen at a mall or shopping center.

Consumers or other users in search of certain information may interact directly with the public display (115). The public display (115) is configured to interact with a plurality of users (120, 125, 130) simultaneously or asynchronously. These particular characteristics makes it possible for various users (120, 125, 130) to come and go according to schedule constraints and the amount of time each desires to spend interacting with the public display (115). The ability of the exemplary system (100) to accept multiple users (120, 125, 130) concurrently also reduces the likelihood that a consumer will have a negative experience associated with waiting in a line for access to the system (100). The public display (115) may be situated such that more people than its immediate users (120, 125, 130) may also view content being displayed.

In the exemplary system (100) of the present embodiment, the users (120, 125, 130) interact directly with the public display (115). In some embodiments, this interaction may be accomplished by the users (120, 125, 130) touching certain touch-sensitive areas of a screen of the public display (115) and using interactive menus displayed on the screen to provide and receive data. In other embodiments, the exemplary system (100) may include voice recognition software, and users (120, 125, 130) may provide data, such as menu selections, to the exemplary system (100) by speaking or saying the data aloud in response to promptings from the public display (115).

Data received from users (120, 125, 130) through the interface of the public display (115) is transmitted to and received by the central processing element (105). In the embodiment shown, data may be received from the users (120, 125, 130) by the public display (115) and then routed to the central processing element (105). However, in other embodiments, the data may be received directly by the central processing element (105) in conjunction with promptings from the public display (115). Examples of these other embodiments include, but are not limited to, embodiments utilizing voice recognition software (as mentioned above), and embodiments involving the use of personal electronic devices, as will be explained further in conjunction with other figures.

The central processing element (105) is configured to asynchronously receive parallel user queries and present content from the database relevant to each of the queries on the public display. In this way, not only the immediate users (120, 125, 130) of the system may view the targeted advertising, but rather the advertising will be available to other users, bystanders, and passersby. The central processing element may be selected from the group including: computers, servers, application specific integrated circuits, other processors, and the like.

The database (110) of the present specification is configured to store targeted advertisement content. The targeted advertisement content may be especially intended for users (120, 125, 130) that meet certain criteria which can be determined through the interaction with the users (120, 125, 130) of the exemplary system (100) and the information about those users obtained thereby. For example, in the course of interacting with the public display (115), a user (120, 125, 130) may submit a query having one or more keywords. Certain business and other entities may have paid to operator of the system (100) for the privilege of displaying their advertising content to users in response to the user entering certain keyword or other criteria into the system (100), for example, as a search query.

All advertising content together with its corresponding targeting or triggering information is stored in the database (110). In some embodiments, advertisements may be directly targeted to users whose queries meet certain criteria. In other embodiments, one or more software algorithms may be implemented by the central processing elements (105) to determine which of the advertising content stored in the database (110) is most relevant or most likely relevant to the users (120, 125, 130) in light of information harvested from user queries and user input received.

Additional consumer content such as sales notifications, product comparisons, merchandise stock information, directions, coupon codes, public service information, announcements, interactive entertainment and the like may be stored in the database (110). Keyword matching, metadata, or algorithms may be used to determine which of the additional consumer information is most relevant to user queries or input and provide the relevant consumer information to the users (120, 125, 130) at the public display (115).

The availability of this additional consumer information from an interactive and convenient system (100) may provide an incentive for the users (120, 125, 130) to interact with the system (100). This will allow the system to ascertain information about the users (120, 125, 130) and, thus allow the system (100) to make targeted advertisements to the user based on the information received from that user.

In some embodiments, additional factors may be used in determining which of the targeted advertisements and consumer content stored in the database is most relevant to users (120, 125, 130). For example, the advertisement and consumer content results presented on the public display (115) may depend on the number of users (120, 125, 130), commonalities between queries of all the users (120, 125, 130), a user's prior history of interaction with the system (100), and the like. Similarly, search queries from multiple consumers may render particular content to be displayed on networked public displays at other locations in the area.

Furthermore, additional consumer content may be provided to the users (120, 125, 130) as a result of additional interaction between the users (120, 125, 130) and the public display (115). For example, results to a user query shown on the public display (115) may be provided to the users (120, 125, 130) in a format that allows or encourages further interaction with the system (100) to receive more specific consumer content. In some embodiments, each query by a user (120, 125, 130) may result in additional targeted advertisements and consumer content being shown on the public display (115). In many embodiments, it may be desirable to provide engaging consumer content to maintain user interest and encourage additional interaction between the user and the system (100).

In one example of this additional interaction between the users (120, 125, 130) and the system (100), upon receiving consumer content and relevant ads as the result of a keyword query to the system (100), a user (120, 125, 130) may interact further with the system (100) to retrieve useful information, be sent a coupon, be entered into a sweepstakes or other contest, or become eligible to make a purchase at a stated price. This further interaction may be analyzed by the central processing element (105) to present additional or more relevant advertisements on the public display (115).

In another example of such continuous interaction between the public display (115) and the users (120, 125, 130), the public display (115) may be used to auction various goods available for purchase. Users (120, 125, 130) interested in purchasing the goods for sale may interact with the exemplary system (100) to place bids or see product specifications. As various users (120, 125, 130) bid on items, the central processing element (105) may determine which advertisements in the database (110) are most relevant to the demographics of the users (120, 125, 130) bidding on the items. The relevant ads may be presented with the auction information on the public display (115).

A variety of revenue models may be used to make the exemplary system (100) and those like it profitable to its owners or operators. In some embodiments, as mentioned above, advertising entities may purchase the right to associate their advertisements with certain keywords entered by users. Another revenue model would charge advertisers based on the amount of information obtained from a user indicating that the user is a likely consumer of that advertiser's goods or services. A record may be kept by the central processing element (105) of the information received from each user and the advertising served to that user as a result. In this way, it can be determined how well the system (100) matched advertising to that user's demographics and the consequent charges to be made to the corresponding advertiser.

Other possible revenue models may be used. Such models include, but are not limited to, charging advertisers a percentage of resultant sales of advertised products, charging advertisers a fixed fee for items listed in the database, charging users a fee for access to the system (100), charging for hard copies of consumer content or advertisements, loyalty programs, and combinations thereof.

Figure 2:
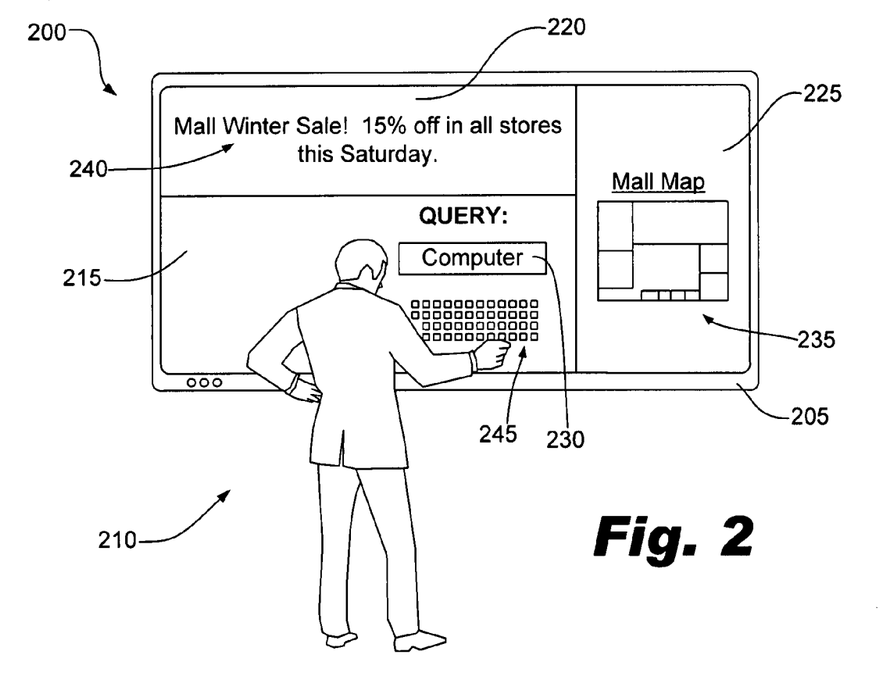
FIG. 2 is an illustration of an exemplary system of providing content to consumers.

Referring now to FIG. 2, an exemplary system (200) of providing content to consumers is shown. A central processing element having a database of content is in communication with a public display (205). The central processing element may be physically part of the public display (205). In other embodiments, the public display (205) is electrically connected to a separate central processing element through cables or a wireless connection.

A user (210) is shown interacting with the system (200) through a public display (205). The public display (205) of this embodiment is a large screen at a prominent location in a public area, such as a shopping mall or theme park. While the system (200) is configured to interact concurrently with a plurality of users, it may also function with only one user (210) as shown in the example of FIG. 2.

The public display (205) at this stage of user interaction is partitioned into first, second and third portions (215, 220, 225, respectively). The first portion (215) includes an on-screen keyboard (245) through which the user (210) may enter data such as a query (230). In this particular embodiment, the user (210) is shown entering a query with a single keyword, e.g., "computer."

The second portion (220) of the public display (205) is configured to present an advertisement (240). As the central processing element has not yet received a query (230) from the user (210), the advertisement (240) is targeted to the general public. The third portion (225) of the public display (205) is configured to display public information (235) such as a map of the surrounding vicinity. It is to be understood that the public display (205) may have more, fewer, or no partitioned portions according to the number of users interacting with the system (200) and a desired interface or menu setup.

Figure 3:
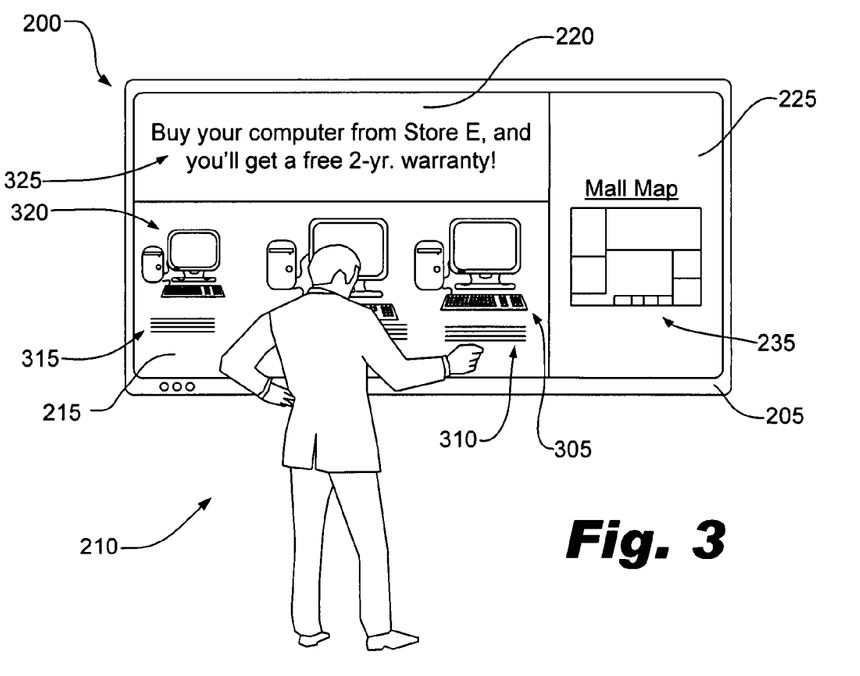
FIG. 3 is an illustration of an exemplary system of providing content to consumers.

Referring now to FIG. 3, the system (200) is shown after the "computer" query (230, FIG. 2) has been received by a central processing element and processed. A relevant ad (325) has been retrieved from the database and is presented in the second portion (220) of the public display (205). Additionally, relevant consumer content, including representations (305, 320) of various products for sale with corresponding informative text (310, 315), has been retrieved from the database and displayed in the first portion (215) of the public display. Additionally, the location of stores selling computer-related goods or services may be indicated on the map shown in the third portion (225) of the display (205).

Figure 4:
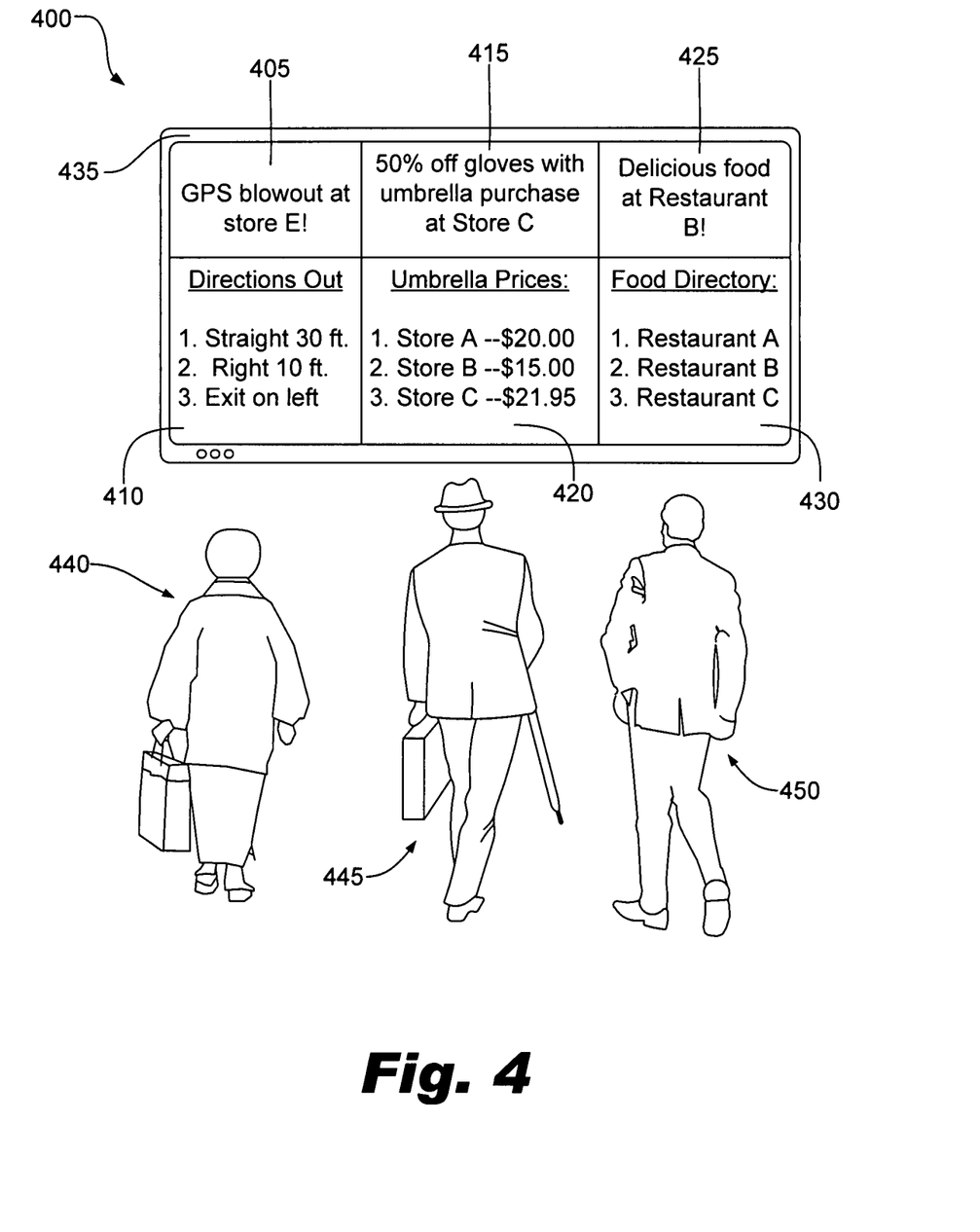
FIG. 4 is an illustration of an exemplary system of providing content to consumers.

Referring now to FIG. 4, an exemplary system (400) is shown for providing content to multiple consumers in a public place, such as a shopping mall. The system (400) is similar to the system (200, FIG. 2) described in FIGS. 2 and 3 above. The system (400) is shown after queries from three separate users (440, 445, 450) have been received by the central processing element. The system (400) includes a public display (435) partitioned into six portions (405, 410, 415, 420, 425, 430).

For the first user (440), a query regarding the nearest exit from the mall results in directions out of the mall being presented on the second portion (410) of the display (435) and a relevant advertisement being presented on a first portion (405) of the public display (435). For example, the relevant advertisement might be a sales event or special offer at a store the user (440) will pass in using the requested directions to the nearest exit.

For the second user (445), a query regarding a product results in relevant advertisement being presented on a third portion (415) of the display (435) together with a list of stores carrying the product in question being displayed on a fourth portion (420) of the display (435). For the third user (450), a query regarding takeout food returns a relevant advertisement on a fifth portion (425) of the public display (435) and a directory of nearby restaurants on a sixth portion (430) of the display (435).

In a public display (435) consistent with the principles of this specification, the display area and presentation of advertisements may be dynamically configured based on the amount of money an advertiser has paid, the number of advertisements being displayed, and the relevance of the advertisements to the queries of users (440, 445, 450). Essentially, the public display (435) may be configured to present content to the users (440, 445, 450) in such a way that revenue from advertisers is maximized.

Figure 5:
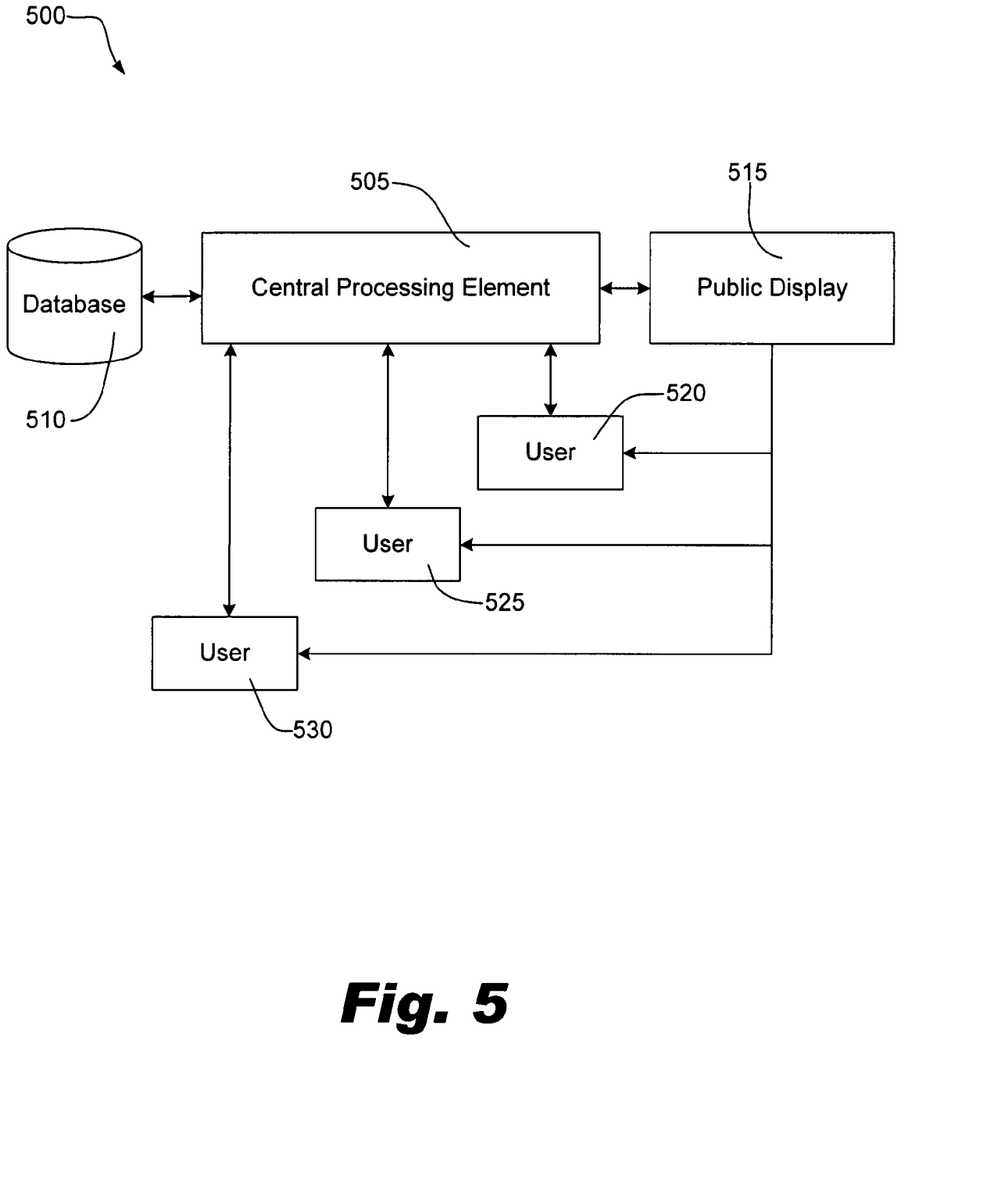
FIG. 5 is a block diagram of an exemplary system of providing content to consumers.

Referring now to FIG. 5, a block diagram of another exemplary system (500) for providing content to customers is shown. The system (500) includes a database (510) of targeted advertisements and consumer content. A central processing element (505) is configured to concurrently receive queries from parallel users (520, 525, 530) and present content from the database relevant to each of the queries on a public display (515).

Rather than providing information to the central processing element (505) via the public display (515), the users (520, 525, 530) of this particular embodiment interact directly with the central processing element (505). In some embodiments, this may be accomplished through personal electronic devices such as cellular phones, pocket Personal Computers (PCs) PDAs, custom devices and the like. These personal electronic devices may be in communication with the central processing element (505) through a wireless link such as a typical 802.11(x) WiFi or Bluetooth connection. In other embodiments, personal electronic devices may be in communication with the central processing element (505) through a mobile network offering Simple Message Service (SMS) text messaging or internet service. Still in other embodiments, the personal electronic device may be connected to the central processing element with a physical cable.

In some cases a personal electronic device may include a camera or other optical device configured to read an encoded image such as a two-dimensional bar code on the public display. The image may provide additional information directly, through data encoded in the image, or indirectly, by directing the personal electronic device to an outside source of information accessible through SMS, the internet, a local network, or the like. The personal electronic device may have preinstalled software enabling it to read the encoded images, or the software may be available from an outside party.

Relevant advertisements and consumer content are still presented to the public display (515) in response to queries received from the users (520, 525, 530) by the central processing element (505). However, the same and/or additional relevant consumer content and/or advertisements may also be sent from the central processing element (505) to the individual users (520, 525, 530) via the personal electronic devices that are used by the individual users (520, 525, 530) to submit queries or input data to the central processing element (505). This additional relevant content may include personalized codes, bid information, receipts, or information that is not cost-effective to present publicly on the public display (515).

Furthermore, the use of personal electronic devices may allow for personalization of content provided from the system (500) to users. Personal electronic devices often provide unique identification information (such as a phone number or network identifier) that may be used to track queries and interaction between the user of the personal electronic device and the system (500) and store a profile for the user. By evaluating the profile, algorithms may be used to provide the relevant advertisements and information to the user, which may cause both advertisement revenues and user satisfaction to increase.

In some embodiments, relevant advertising provided to a user having a profile may be based on previous interactions of other users having similar profiles. By coupling a user rating system to content provided from the system (500), a complete feedback loop may be obtained, and increasingly more relevant advertisements and content may be delivered to a user. Additional embodiments may allow a user to associate certain content with a "tag," which is then accessible by other users. Users of such embodiments may be able to search by content tags generated by other users.

Figure 6:
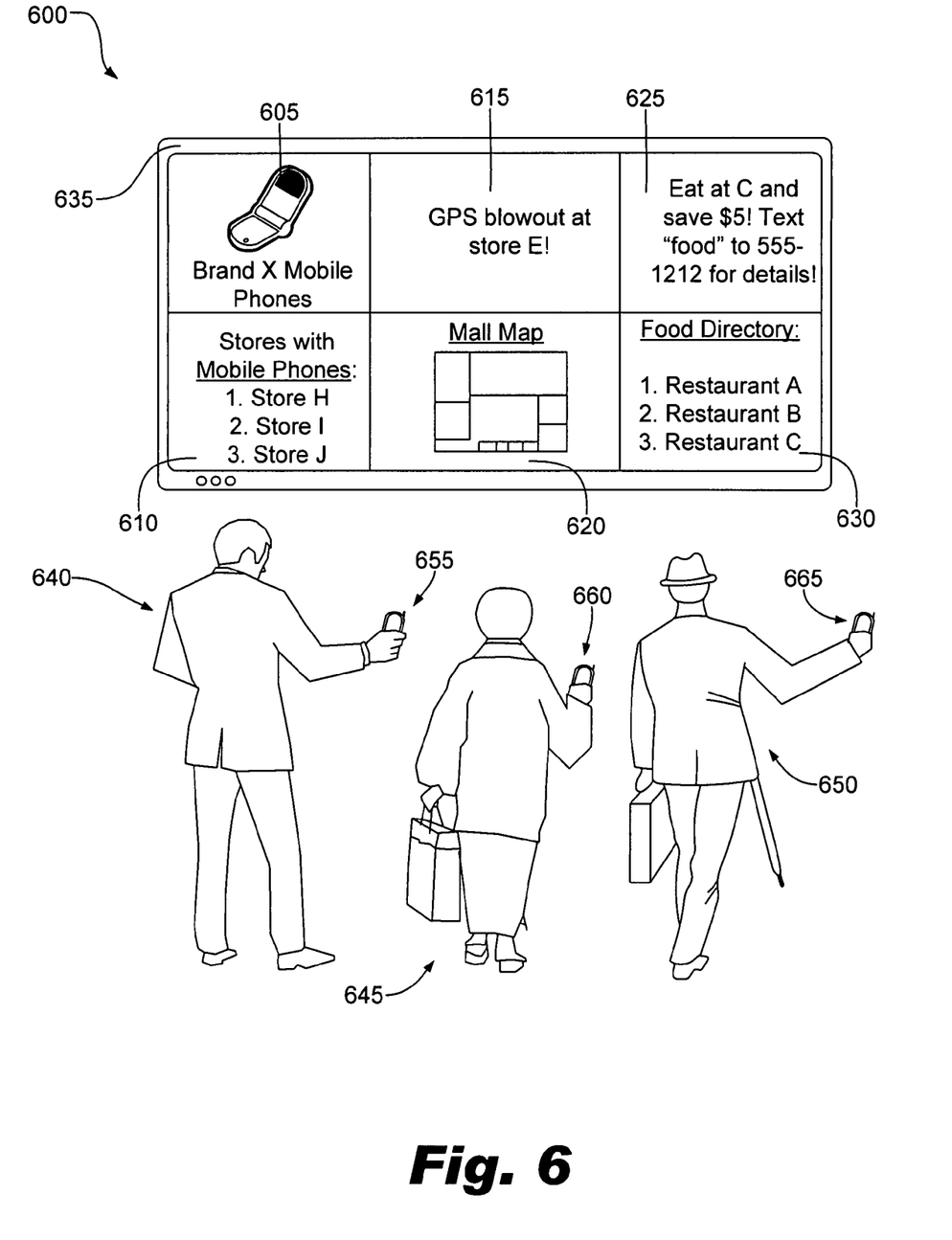
FIG. 6 is an illustration of an exemplary system of providing content to consumers.

Referring now to FIG. 6, an exemplary system (600) is shown consistent with the block diagram of FIG. 5 described above. In the example of FIG. 6, each of the several users (640, 645, 650) interacts with a central processing element (505, FIG. 5) via a personal electronic device (655, 660, 665) as described above. Upon receiving the queries or other input from the users (640, 645, 650), the central processing element (505, FIG. 5) determines which targeted advertisements and consumer content are most relevant to the queries submitted by the users (640, 645, 650) and, accordingly, displays the relevant advertisements in the top three portions (605, 615, 625) of the public display (635) and the relevant consumer content or query response in the bottom three portions (610, 620, 630) of the public display (635).

As mentioned previously, additional interaction may take place between the users (640, 645, 650) and the central processing element (505, FIG. 5) via the personal electronic devices (655, 660, 665) and/or the public display (635). Additional requests for information received by the central processing element (505, FIG. 5) may result in additional relevant advertisements being shown on the public display (635) and possibly additional information being sent to user personal electronic devices (655, 660, 665).

Exemplary Methods

Figure 7:
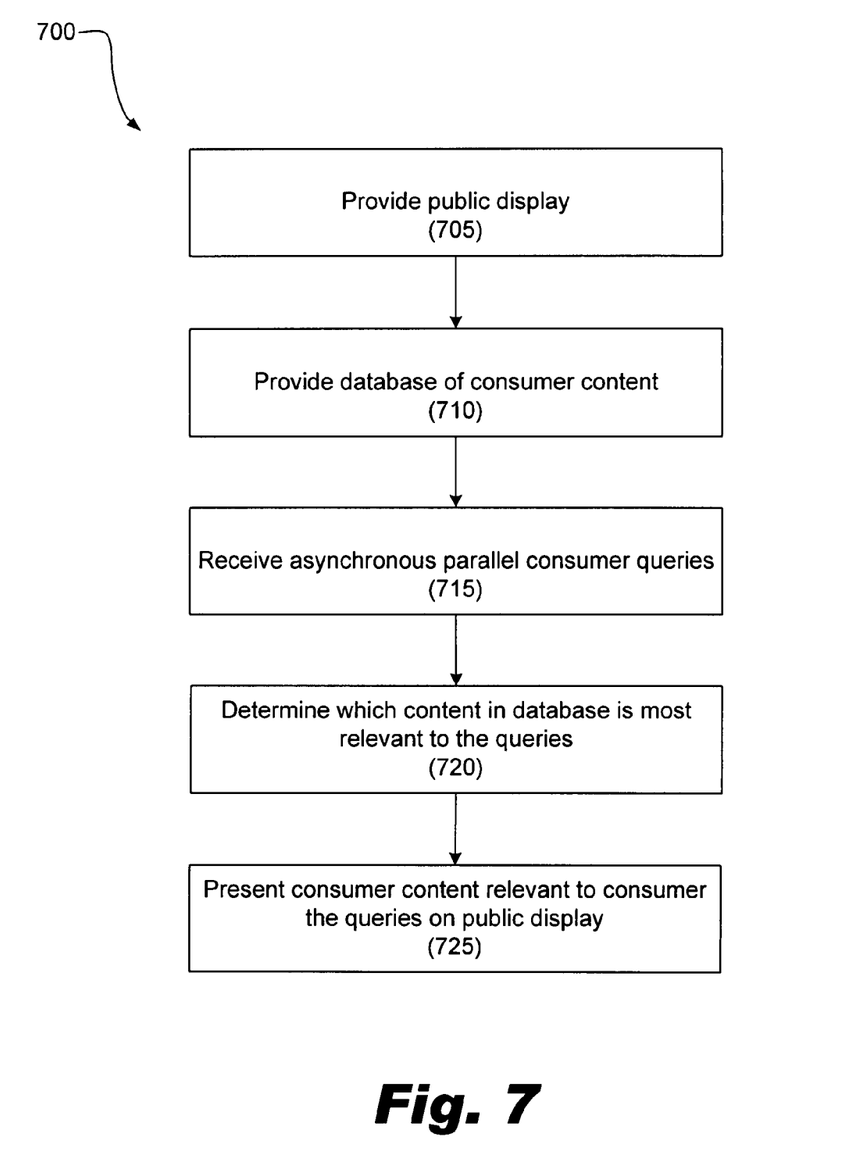
FIG. 7 is a flowchart illustrating an exemplary method of providing content to consumers.

Referring now to FIG. 7, a flowchart illustrating a method (700) of providing content to consumers is shown. The method includes providing (step 705) a public display, providing (step 710) a database of consumer content and advertising materials, receiving (step 715) concurrent parallel consumer queries or data, determining (step 720) which content in the database is most relevant to the queries or data received, and presenting (step 725) consumer content relevant to the queries or data from the database on the public display.

The consumer content may be selected from the group consisting of: advertisements for products or services, product information, pricing information, auction information, reverse auction information, promotion information, offers, coupons, cross-promotions, and combinations thereof. Furthermore, the method (700) may include partitioning the public display to concurrently present consumer content relevant to different consumer queries or data.

Additionally, at least a portion of the consumer queries or data may be transmitted to a central processing element using personal electronic devices as described above. In some embodiments, it is anticipated that consumers may submit queries through both the public display and personal electronic devices. Additionally, at least a portion of the consumer content may be responsively provided to respective users via the personal electronic devices being operated by those users.

Figure 8:
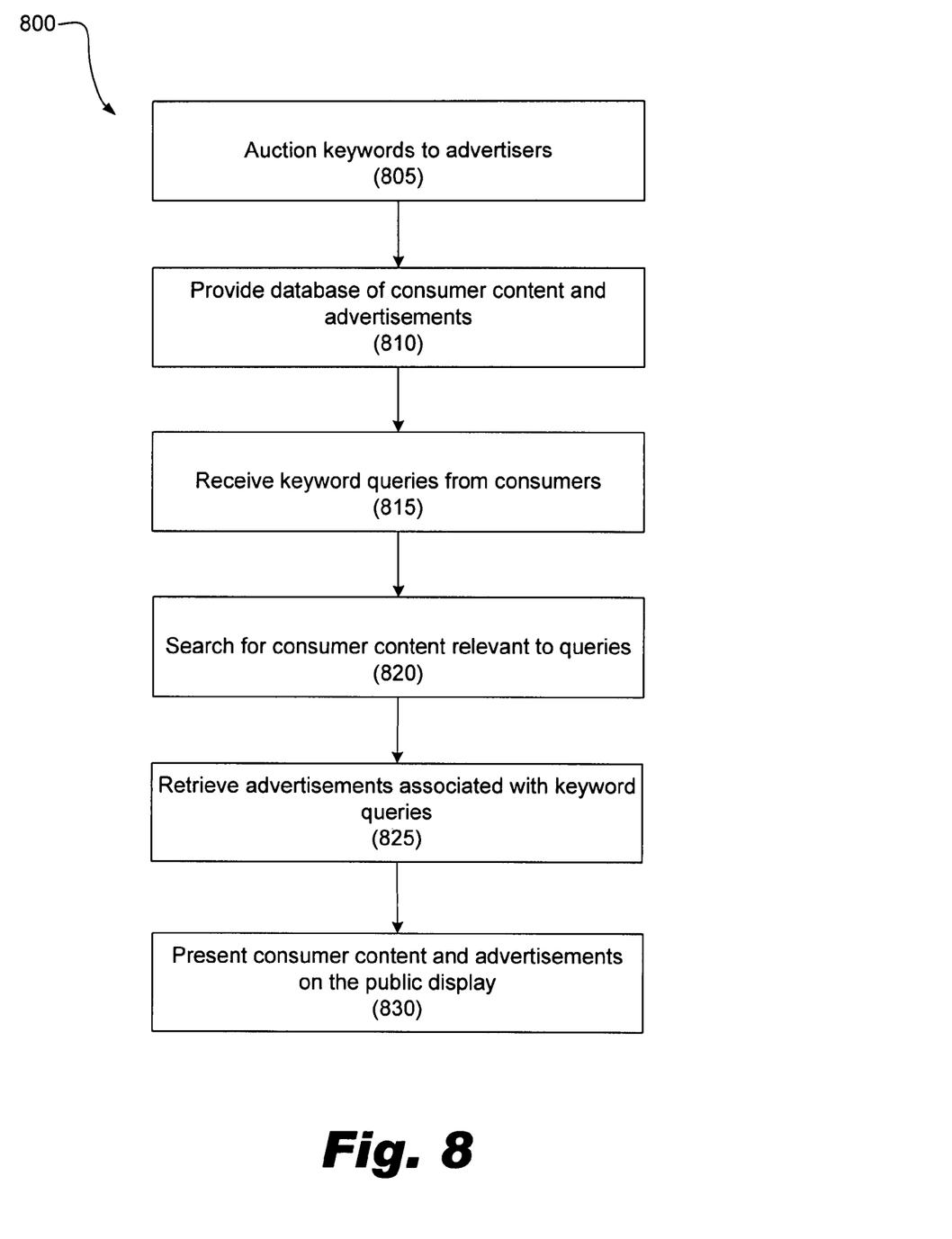
FIG. 8 is a flowchart illustrating an exemplary method of providing content to consumers.

Referring now to FIG. 8, a flowchart illustrating an exemplary method (800) of advertising goods or services to consumers is shown. The method (800) includes the steps of auctioning (step 805) keywords or other criteria to advertisers that will be used to match advertising to user input meeting the specified criteria. By purchasing the keywords or other criteria, advertisers purchase the right to present an advertisement on a public display in response to a consumer query or data input that matches that criteria, for example, that contains specific the keywords.

The method (800) further includes providing (step 810) a database of consumer content and advertisements. The advertisements in the database all contain corresponding keywords corresponding to potential queries or data input by users. As keyword queries and other data are received (step 815) from various users, the method includes searching (step 820) for relevant consumer content in the database based on the user query or data entered and retrieving (step 825) corresponding advertisements or other content from the database. The consumer content and the advertisement are then presented (step 830) on a public display.

In some embodiments of the method (800), queries may be received from the consumer or additional consumer content and/or advertisements may be provided to the user via a personal electronic device such as a pocket PC, a PDA, a mobile phone, or the like. Furthermore, the advertisement may be presented on multiple public displays in communication with the first public display.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for providing content to consumers, comprising:
   a public display;
   a database configured to store said content; and
   a central processing element configured to concurrently receive parallel user queries from a plurality of users and concurrently present content from said database on said public display relevant to each user's query.

2. The system of claim 1, wherein said content comprises advertising.

3. The system of claim 1, wherein said central processing element is further configured to determine which of said content stored in said database is most relevant to each user's query.

4. The system of claim 1, wherein said central processing element partitions said public display to provide separate portions corresponding to a query from, or content being displayed for, each particular said user.

5. The system of claim 1, wherein said public display is a touch-sensitive display for receiving said user queries.

6. The system of claim 1, further comprising a personal electronic device corresponding to each said user, wherein each said user provides said user query to said central processing element via a corresponding said personal electronic device.

7. The system of claim 6, wherein said central processing element provides at least a portion of said content relevant to each user's query via a personal electronic device corresponding to that user.

8. A method of providing content to consumers, said method comprising:
   providing a public display electronically controlled by at least one central processing element;
   receiving parallel user queries concurrently in said at least one central processing element from a plurality of users of said public display; and
   concurrently presenting consumer content related to each of said queries from a database with said central processing element on said public display.

9. The method of claim 8, wherein said consumer content comprises advertising.

10. The method of claim 8, further comprising transmitting at least a portion of said user queries using personal electronic devices corresponding to said users.

11. The method of claim 10, further comprising presenting at least a portion of said consumer content via said personal electronic devices.

12. The method of claim 8, further comprising partitioning said public display to concurrently present consumer content relevant to user queries from different users.

13. The method of claim 8, further comprising receiving said user queries through said public display which comprises a touch-sensitive display device.

14. The method of claim 13, further comprising displaying a keyboard as a user interface on said touch-sensitive display device.

15. A method of advertising goods or services to consumers, said method comprising:
   selling an advertiser rights to display an advertisement on a public display controlled by at least one central processing element in response to user queries meeting specific criteria;
   receiving parallel user queries in said central processing element from a plurality of users at said public display and comparing said user queries to said criteria; and
   for each said user query that meets said criteria, concurrently displaying said advertisement on said public display.

16. The method of claim 15, wherein said criteria comprises keywords in said user queries.

17. The method of claim 15, further comprising presenting additional content relevant to said user queries.

18. The method of claim 17, further comprising presenting at least a portion of said additional content to a user via a personal electronic device corresponding to that user.

19. The method of claim 15, further comprising providing at least one user query through a personal electronic device corresponding to a particular user.

* * * * *